United States Patent [19]

Ricks et al.

[11] Patent Number: 5,556,125
[45] Date of Patent: Sep. 17, 1996

[54] AIR BAG INFLATOR FOR SNAP-ON ATTACHMENT TO A STEERING WHEEL

[75] Inventors: Merle K. Ricks, Layton; Janiel Sorenson, Salt Lake City, both of Utah; John A. Duran, Glendora; Javier Vargas, Montebello, both of Calif.

[73] Assignees: Morton International, Inc., Chicago, Ill.; Avibank Mfg., Inc., Burbank, Calif.

[21] Appl. No.: 505,592

[22] Filed: Jul. 21, 1995

[51] Int. Cl.⁶ .................................................. B60R 21/20
[52] U.S. Cl. .................. 280/728.2; 411/508; 411/509; 24/453; 24/704.1
[58] Field of Search .................. 280/728.2, 731, 280/732, 730.1, 728.1; 411/508, 509, 510, 913; 24/453, 704.1, 694, 618

[56] References Cited

U.S. PATENT DOCUMENTS

| | | | |
|---|---|---|---|
| 3,842,709 | 10/1974 | Fuqua | 411/508 |
| 5,087,069 | 2/1992 | Corbett et al. | 280/731 |
| 5,207,544 | 5/1993 | Yamamoto et al. | 280/728.2 |
| 5,333,897 | 8/1994 | Landis et al. | 280/728.2 |
| 5,380,037 | 1/1995 | Worrell et al. | 280/728.2 |

*Primary Examiner*—Kevin Hurley
*Assistant Examiner*—Peter C. English
*Attorney, Agent, or Firm*—Mason, Kolehmainen, Rathburn & Wyss

[57] ABSTRACT

A new and improved air bag inflator module adapted for quick action, snap-on, permanent mounting on a steering wheel requires the use of no tools to install. The module is pre-positioned in front of the steering wheel and is thrust into place until locked. The inflator module includes a base facing and movable in one direction directly toward the steering wheel with a plurality of quick action, snap-on type fasteners carried thereby. Each fastener has a first portion extended into an opening in the steering wheel as the inflator module is pushed into place with a unidirectional thrust and a second portion for supporting the first portion projecting outwardly thereof. A snap-action, annular compressible and expandable holding skirt is provided on the first portion of each fastener for lockingly engaging a surface on the steering wheel when expanded after the first portion of the fastener is fully inserted through an aligned opening in the steering wheel. The holding skirt is initially compressed while passing through an opening and after passage automatically springs back and expands to engage a surface on the steering wheel for permanently retaining the fastener in interconnecting relation therebetween. First and second portions of each fastener are releasable from one another using an ordinary hand tool such as a screw driver for permitting the inflator module to be bodily removed from the steering wheel after installation. The hand tool may also be used for reassembling the first and second portions of each fastener so that the inflator module may be remounted on the steering wheel.

20 Claims, 2 Drawing Sheets

AIR BAG INFLATOR FOR SNAP-ON ATTACHMENT TO A STEERING WHEEL

BACKGROUND OF THE INVENTION

1. Field of the Invention

The present invention relates to air bag inflators generally and more particularly to an air bag inflator module which can be quickly mounted in place on a vehicle steering wheel or other support in a motor vehicle without requiring the use of tools utilizing quick-acting or snap-on fasteners for permanent attachment, and including a release system so that the module can be removed for service and/or replacement. The present invention is particularly designed for providing easy and quick mounting of an air bag inflator module on a vehicle steering wheel by merely pushing the air bag module into place until fasteners are locked to permanently secure the module to the steering wheel. The fasteners permanently retain the air bag module in place and are well able to withstand shock forces, velocities and stresses during air bag deployment. The fasteners are releasable using an ordinary hand tool so that the air bag module may be removed from the steering wheel or other support for service and/or replacement, and thereafter the module can be remounted or reinstalled on the vehicle support, again by snapping into place on the steering wheel.

2. Background of the Prior Art

A break-away fastening system for air bag deployment doors is disclosed in copending U.S. patent application Ser. No. 08/286,823, filed Aug. 5, 1994, which application is assigned to Morton International, Inc. The fasteners utilized in the fastening system disclosed are designed to fracture upon air bag deployment so that the doors are released to open whereas the fasteners of the present invention are designed to retain the whole air bag inflator module in place on the steering wheel or other supporting element during air bag deployment, but are manually releasable when desired, so that the air bag module may be removed for service and/or replacement.

OBJECTS OF THE INVENTION

The present invention has an object to provide a new and improved air bag inflator module adapted for quick action, snap-on mounting or attachment to a vehicle support or steering wheel without requiring the use of tools.

It is another object of the present invention to provide a new and improved air bag inflator module of the character described which can be released from attachment after mounting in place so that the inflator can be removed for service and/or replacement.

Yet another object of the present invention is to provide a new and improved air bag inflator module of the character described which can be permanently mounted on a vehicle steering wheel by pre-positioning the air bag module directly in front relative to a steering wheel or other support in a motor vehicle and then merely pushing the module into place to lock snap-on fasteners for permanently securing the air bag inflator module in place.

Still another object of the present invention is to provide a new and improved air bag inflator module of the character described employing fasteners which can be released with an ordinary hand tool such as a screw driver for permitting the air bag inflator module to be removed for servicing and/or replacement.

Yet another object of the present invention is to provide a new and improved air bag inflator module of the character described which can be reattached or remounted on the vehicle support after removal by pushing the module into place to lock the snap-in fasteners.

Yet a further object of the present invention is to provide a new and improved air bag inflator module of the character described wherein a fastening system for attaching or mounting the air bag inflator module on the vehicle steering wheel or other support is strong enough to withstand shock forces, velocities and stresses developed during air bag deployment and positively retain the module in place.

Still another object of the present invention is to provide a new and improved air bag inflator module of the character described employing fasteners of a type having a compressible and expandable skirt for locking and holding the module in place.

BRIEF SUMMARY OF THE PRESENT INVENTION

The foregoing objects and advantages of the present invention are accomplished in a new and improved air bag inflator module adapted for quick action, snap-on, permanent mounting or attachment onto a support provided in a motor vehicle such as a steering wheel. Installing the inflator module requires the use of no tools for permanent installation on the support and is accomplished by pre-positioning the module in front of the support and thrusting the module into place. The inflator module includes a base facing and movable in one direction directly toward the support for establishing a permanent fixed attachment thereto. A fastening system including a plurality of quick action, snap-on type fasteners is provided and the fasteners extend between the base and the vehicle support for securing the inflator module permanently locked in place. The base of the module or the vehicle support is provided with openings for each fastener for receiving a first portion of the fastener extended therethrough as the inflator module is pushed into place on the steering wheel with a unidirectional thrust. Each fastener includes a second portion permanently mounted on the base or the support opposite an opening for supporting the first portion of the fastener projecting outwardly thereof. A snap-action compressible and expandable holding skirt is provided on the first portion of each fastener for engaging an opposite surface on the base or the support when expanded after the first portion of the fastener is inserted through an opening. The holding skirt is initially compressed when passed through an opening and once through the opening automatically springs back and expands after full insertion to engage the opposite side of the base or the support for permanently retaining the fastener in interconnecting relation therebetween. Each fastener is releasable using an ordinary hand tool such as a screw driver and this permits the inflator module to be bodily removed or detached from the support for service and/or reinstallation. Thereafter, the module can be reattached or remounted on the support, again by snapping into place on the steering wheel. An ordinary hand tool is used for interconnecting the first and second portions of each fastener for reuse.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 1:
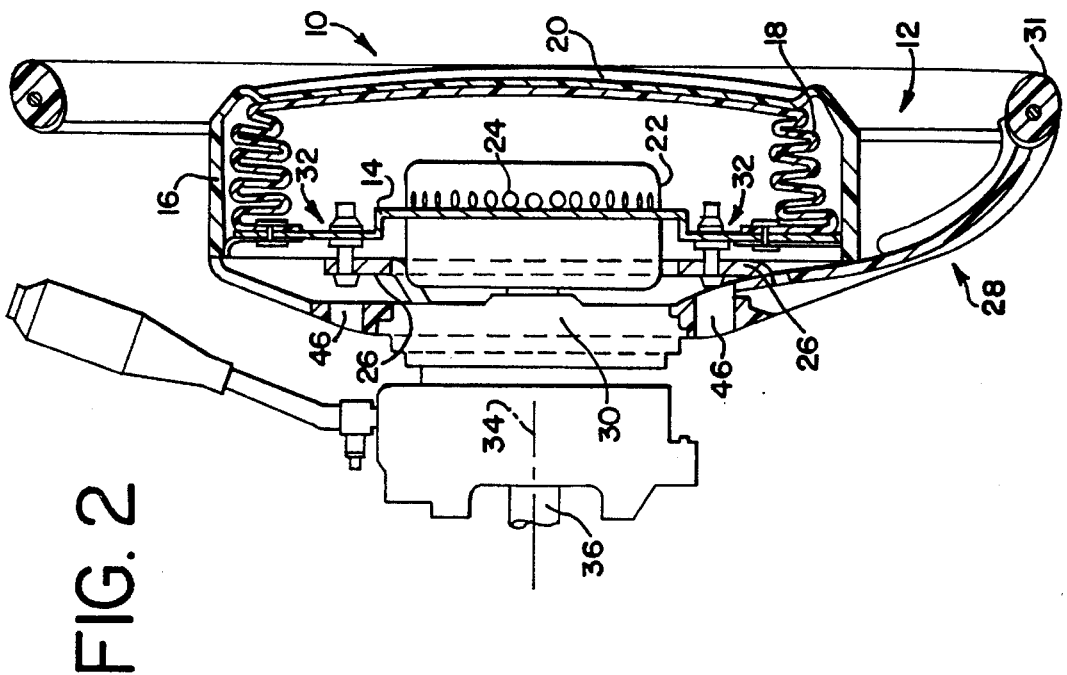
FIG. 1 is a cross-sectional view of a new and improved air bag inflator module designed for quick action, snap-on permanent mounting or attachment onto a vehicle support or steering wheel constructed in accordance with the features of the present invention and illustrated as it is pre-positioned adjacent a vehicle steering wheel ready for mounting thereon with a unidirectional push or thrust.
Figure 2:
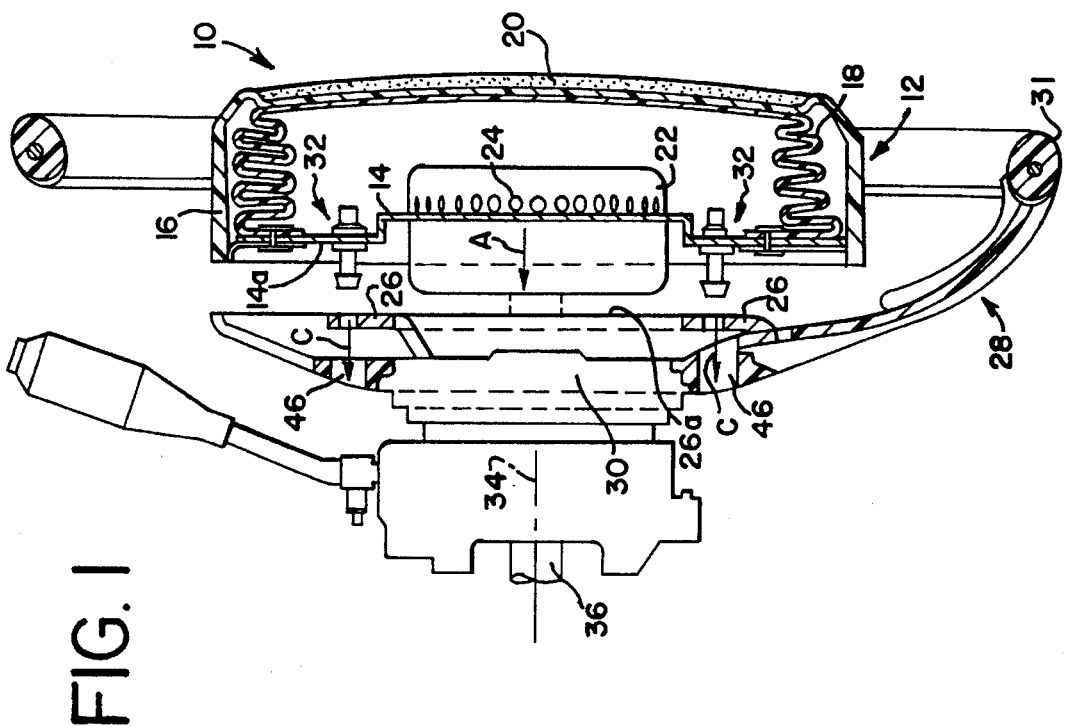
FIG. 2 is a cross-sectional view illustrating the air bag inflator module after being permanently mounted in place on the steering wheel.

Referring now more particularly to the drawing, in FIGS. 1 and 2 is illustrated a new and improved air bag inflator module 10 constructed in accordance with the features of the present invention. The inflator module 10 includes a housing 12 having an annular base 14 joined around the periphery with a side wall 16 forming a protective enclosure for a folded up inflatable air bag 18. At an outwardly facing peripheral edge the housing side wall 16 is joined with a frangible cover 20 designed to open when the air bag 18 is rapidly inflated. Centrally located on the annular base is an inflator canister 22 containing solid gas generant material and having a plurality of gas discharge ports 24 arranged in a ring designed to rapidly discharge the gas that is generated to rapidly inflate the air bag 18 in an emergency.

In accordance with the present invention, the air bag inflator module 10 is designed to be quickly permanently mounted or attached onto a support plate or support elements 26 provided on a steering wheel 28 of a motor vehicle or other vehicle supporting element such as a peripheral edge portion around a panel opening when provided for a passenger side type of inflator module. The support elements 26 extend from a central hub portion 30 toward an outer rim 31 of the steering wheel 28 and provide surfaces 26a directly facing an outside surface 14a of the housing base 14 as shown in the drawing.

In accordance with the present invention, the air bag inflator module 10 is designed to be permanently mounted or attached to the support elements 26 of the vehicle steering wheel 28 by first pre-positioning the module with the base 14 directly facing the support elements 26 (FIG. 1) and then without requiring any tools, pushing or thrusting the module 10 toward the central portion of the steering wheel in one direction generally normal to surfaces 26a and 14a as indicated by the Arrow "A" in FIG. 1 until reaching the fully mounted position of FIG. 2.

In order to secure the air bag inflator module 10 in place as shown in FIG. 2, there is provided a fastening system including a plurality of elongated fasteners 32 (FIG. 3) extending directly between the base 14 and the support elements 26 and aligned generally normal or perpendicular to the surfaces 14a and 26a. Preferably, the fasteners 32 are spaced equilaterally around a central axis 34 of a steering column 36 supporting the steering wheel 28.

Figure 3:
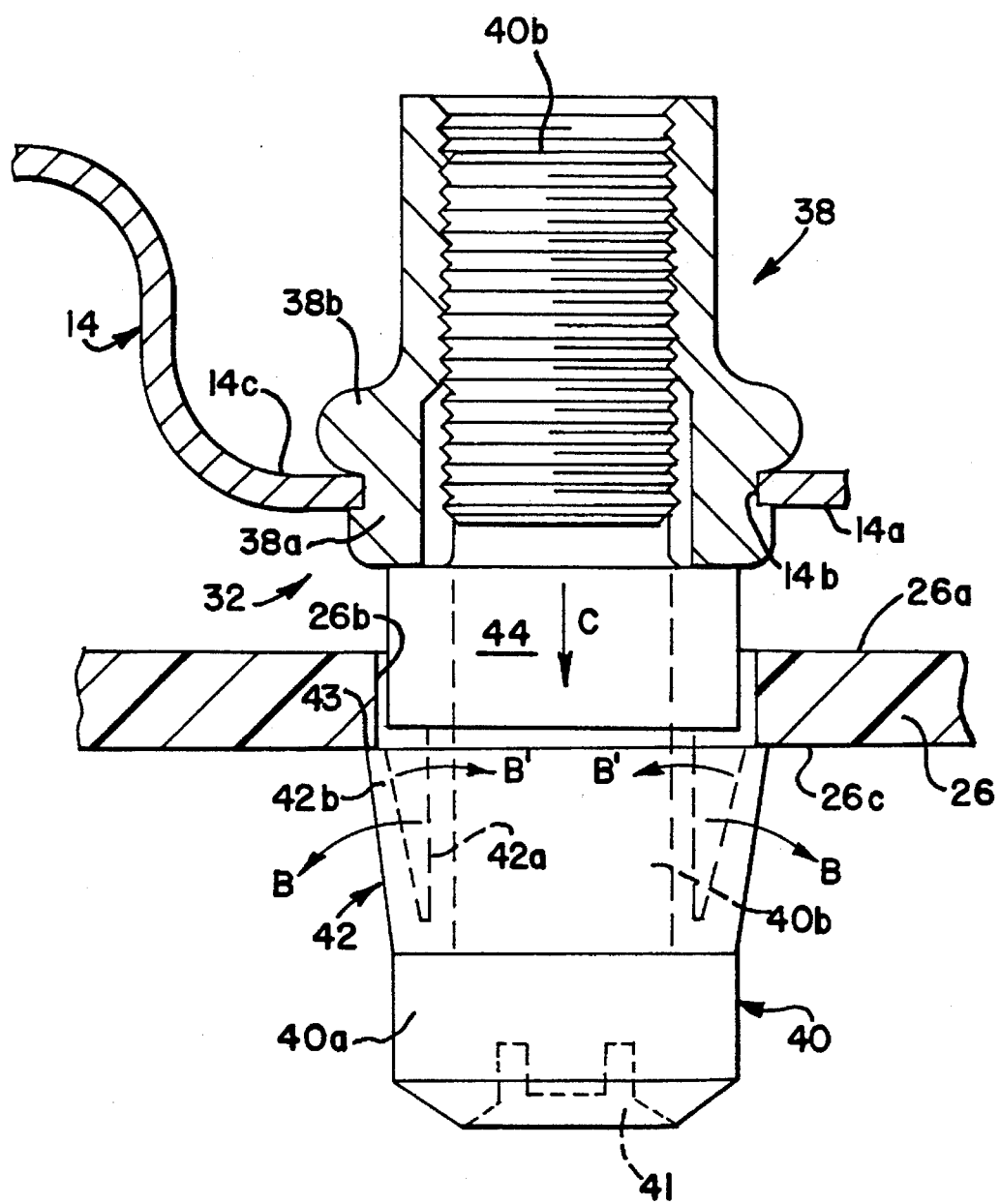
FIG. 3 is an enlarged, fragmentary cross-sectional view illustrating one of the fasteners of the fastening system of the inflator module after mounting on the vehicle steering wheel.

The base 14 of the air bag inflator module 10 is formed with a plurality of openings 14b, one for each fastener 32, and the support elements 26 are provided with matching openings or apertures 26b as best shown in FIG. 3. Each fastener 32 is a quick-acting, snap-on, unidirectional, self-locking type employing an internally threaded, open-ended hollow nut or sleeve, rivet nut, or stake nut or any kind of internally threaded nut element or base 38 fixedly mounted against rotation on the base 14 in an opening 14b and held in place by an end flange 38a facing the adjacent support surface 26a and a radially outwardly projecting upset ring 38b formed to engage an opposite side or inside surface 14c of the module base 14. Each fastener 32 also includes a bolt 40 having an enlarged head 40a at one end and an elongated, threaded shank 40b of smaller diameter threadedly engaged with the internally threaded base 38 which is fixedly mounted on the base 14. The bolt head 40a is formed with a slot or recess 41 in the outer surface for receiving the tip of a screw driver, TORX\ driver or other key element used for tightening or loosening the bolt 40 in the sleeve 38 when required. The head 40a has a diameter less than that of the opening 26b in the support elements 26 so as to easily pass through the opening.

Adjacent the underside of the head 40a, each fastener 32 is provided with an annular frustoconically-shaped holding skirt 42 surrounding the threaded shank 40b and formed with a large diameter end 43 and on the side wall 42b sloping outwardly away from a small diameter end under the head 40a. The skirt includes an inner generally cylindrical side wall 42a around the bolt shank 40b joined with the outer sloped side wall adjacent the head 40a. A free end of the inner side wall 42a joins a thick-walled annular spacer or stop member 44 which comprises an integral part of the fastener body. The spacer 44 has an upper end face bearing upwardly against the flange 38a and has an outer diameter smaller than that of the openings 26b of the support elements 26. The spacers 44 project downward into the openings 26b when the fasteners 32 are thrust toward the steering wheel 28 (Arrow "C"—FIG. 3) during uni-directional mounting of the air bag module 10 in place on the steering wheel 28.

In accordance with the present invention, the large diameter end 43 of the skirt 42 normally extends radially outwardly to an extent greater than the inside diameter of the opening 26b and the skirt wall 42b is compressed radially inwardly (Arrows "B"') as the fasteners 32 are thrust (Arrows "C") into the openings 26b of the support elements 26 until upper free edges 43 of the skirt are past or on an opposite surface 26c or back side of the support elements. At this time the skirt is free to snap back radially outwardly (Arrows "B") to the locking or holding position as shown in FIG. 3 wherein the large diameter end 43 positively engages the back side surface 26c of the support elements 26 outwardly of the opening 26b to lock and hold the air bag module 10 permanently in place as shown in FIGS. 2 and 3.

It is thus seen that the fasteners 32 provide for permanent attachment or mounting of the air bag module 10 on the steering wheel 28, with a simple unidirectional thrust (Arrow "A") until the large diameter end 43 of the compressible skirt 42 snaps back radially outwardly into locked position. The spacers 44 maintain tension on the fastener bolts 40 to prevent rattling and ensure that locking engagement of the skirt 42 and the support elements 26 is maintained. Moreover, the fasteners 32 provide sufficient holding strength so that when the air bag 18 is deployed to inflate the module base 14 and components mounted thereon remain in place on the steering wheel 28.

After initial mounting of the air bag inflator module 10 onto the vehicle steering wheel 28 as previously described, if it is desired to disconnect, release and remove the module for service, repair and/or replacement, each fastener 32 may be disassembled or released by unthreading the bolt 40 from the fixed nut or sleeve 38 using only an ordinary hand tool such as a screw driver, TORX\ driver, "ALLEN" head wrench or the like by turning the bolt until completely unthreaded from the nut element 38. After all of the fasteners 32 have been so disassembled or released, the air bag inflator module 10 can be easily removed from the steering wheel 28. If after such removal is completed, another or the same air bag inflator module 10 is to be reassembled or mounted on the steering wheel 28, remounting or reinstallation is accomplished by a uni-directional thrust until the individual fastener assemblies 32 are snapped into place. The individual fasteners 32 may be replaced or reused and in the latter case, an ordinary hand tool may be applied to turn the heads 40a of the bolts 40 until the threaded shanks 40b engage the internally threaded fixed nut elements 38 and again are in the relative position shown in the drawing in readiness to positively secure the module 10 in place when mounted on the steering wheel 28. To accommodate and provide access to the heads 40a of each fastener 32 for a screw driver, a back portion of the steering wheel 28 is formed with an access opening 46 coaxially aligned with each fastener.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. In combination, an air bag inflator module adapted for rapid snap-on attachment onto a support provided in a motor vehicle, said inflator module including:

a base facing and movable directly toward the support for fixed attachment thereto; and a snap-on fastener extending between said base and the support, one of said base and the support having an opening for receiving a first portion of said fastener extended therethrough and the other of said base and the support having a second portion of said fastener permanently mounted thereon for supporting said first portion projecting outwardly of said one of said base and the support, holding skirt means on said first portion of said fastener compressible radially inwardly when said first portion is passed through said opening and expandable radially outwardly, and after passage having an edge for engaging a surface of said one of said base and the support around said opening for retaining said fastener in interconnecting relation between said base and the support, and release means for disconnecting said first and second portions of said fastener for permitting said inflator module to be detached from said support while said holding skirt means is still expanded.

2. The combination of claim 1, including:

spacer means on said fastener for maintaining said base and said holding skirt means in spaced relation apart after said holding skirt means is expanded.

3. The combination of claim 2, wherein:

said spacer means comprises an annulus mounted on said first portion having opposite ends engageable with said holding skirt means and said second portion.

4. The combination of claim 1, wherein:

said holding skirt means is generally frustoconical and compressible radially inwardly toward a central axis of said fastener in order to pass through said opening and is expandable after passage to move into engagement with said surface.

5. The combination of claim 4, wherein:

said holding skirt means is compressed by passage through said opening in one direction and snaps back radially outwardly after passage to prevent withdrawal in an opposite direction.

6. The combination of claim 1, wherein:

said second portion of said fastener comprises a hollow threaded element fixedly mounted on said base and said opening is formed in said support for receiving said first portion of said fastener which extends into said hollow threaded element and is supported thereby.

7. The combination of claim 6, wherein:

said first portion of said fastener comprises an elongated threaded element threadedly engaged in said hollow threaded element.

8. The combination of claim 7, wherein:

said elongated threaded element includes a head at an outer end thereof dimensioned to pass through said opening.

9. The combination of claim 8, wherein:

said holding skirt means includes a small diameter end adjacent said outer end of said threaded element and a frustoconical side wall tapering outwardly from said head toward said edge, said edge facing said hollow threaded element and normally larger in diameter than said opening.

10. The combination of claim 9, wherein:

said edge of said holding skirt means is compressible radially inwardly to pass through said opening and snaps back radially outwardly after passage is completed.

11. In combination, an air bag inflator module and a support therefor in a motor vehicle, comprising:

an inflator module base adapted to be attached to the support upon movement toward said support in a direction generally normal thereto, one of said base or said support having a fastener receiving opening therein;

a fastener extending axially between said base and said support in said generally normal direction thereto;

said fastener including, hollow base means fixedly attached to one of said base and said support;

elongate means mounted in said hollow base means and extending outwardly thereof toward said fastener receiving opening;

annular holding skirt means mounted on said elongate means and movable therewith along said generally normal direction to pass through said fastener opening while compressed radially inwardly and expandable radially outwardly and after passage having an outer end portion thrust by said expansion into holding engagement with a surface of said base or said support around said opening; and releasable interconnecting means between said hollow base means and said elongate means permitting disconnection therebetween so that said inflator module may be separated from said support.

12. The combination of claim 11, wherein:

said hollow base means of said fastener is fixedly mounted on said base of said inflator module; and said fastener receiving opening is formed in said support opposite thereto.

13. The combination of claim 12, wherein:

said elongate means includes a threaded element and said hollow base means is internally threaded to threadedly engage said elongate means.

14. The combination of claim 13, wherein:

said elongate means includes an enlarged head at an outer end away from said hollow base means dimensioned to pass through said opening in said support.

15. The combination of claim 14, wherein:

said annular holding skirt means is frustoconical in shape and is mounted on said elongate means with a small diameter end adjacent said head and an opposite large diameter end normally larger in diameter than said opening but compressible by a surface of said opening to pass therethrough when said elongate means is moved axially into said opening.

16. The combination of claim 12, wherein:

said releasable interconnecting means comprises engageable threaded portions of said hollow base means and said elongate means.

17. The combination of claim 16, wherein:

tool receiving means is provided at an outer end of said elongate means for turning said elongate means relative to said hollow base means for disconnecting said elongate means and said base means.

18. The combination of claim 17, wherein:

said elongate means includes an enlarged head at said outer end dimensioned to pass through said opening and for retaining said holding skirt means on said elongate means.

19. The combination of claim 18, wherein:

said holding skirt means includes a first portion adjacent said head dimensioned to pass through said opening without interference and a larger second portion away from said head larger than said opening and compressible to pass therethrough.

20. The combination of claim 19, wherein:

said larger second portion of said holding skirt means expands into a locking position engaged with said surface on said support radially outward of said opening after passage through said opening.

* * * * *